United States Patent [19]

Blore et al.

[11] 3,735,146

[45] May 22, 1973

[54] NANOSECOND PULSE MODULATOR

[75] Inventors: William E. Blore; Srbislav V. Zivanovic, both of Goleia, Calif.; Bernard Charest, Ste-foy, Quebec, Canada

[73] Assignee: The United States of America as represented by the Secretary of the Air Force, Washington, D.C.

[22] Filed: June 27, 1972

[21] Appl. No.: 266,811

[52] U.S. Cl. ....................................307/106, 333/20

[51] Int. Cl. ..............................................H03k 3/00

[58] Field of Search ..............................333/1, 20, 99; 328/59, 63, 65; 307/106, 107

[56] References Cited

UNITED STATES PATENTS

| | | | |
|---|---|---|---|
| 3,402,370 | 9/1968 | Ross | 307/106 X |
| 3,078,424 | 2/1963 | Carter et al. | 307/106 X |

*Primary Examiner*—Herman J. Hohauser

*Attorney*—Harry M. Herbert, Jr. and Willard R. Matthews, Jr.

[57] ABSTRACT

Nanosecond pulse modulation of a CW carrier wave propagating in a waveguide transmission line is accomplished by control of a varactor diode disposed across a one-quarter height waveguide section. In its quiescent the varactor diode is series resonant at the frequency of the carrier wave, causing the carrier wave to be reflected (or switched off). Control of the series resonant frequency is accomplished by selection of a diode having appropriate capacitance and package inductance, by diode position within the waveguide section, and by a reverse diode bias. Additional shunt capacitance and resonance control is obtained by means of a variable post proximate to the varactor diode. The varactor diode is converted to parallel resonance (and the CW carrier wave switched on) by periodically forward biasing the varactor diode with pulses from a video drive pulse source.

5 Claims, 1 Drawing Figure

PATENTED MAY 22 1973
3,735,146
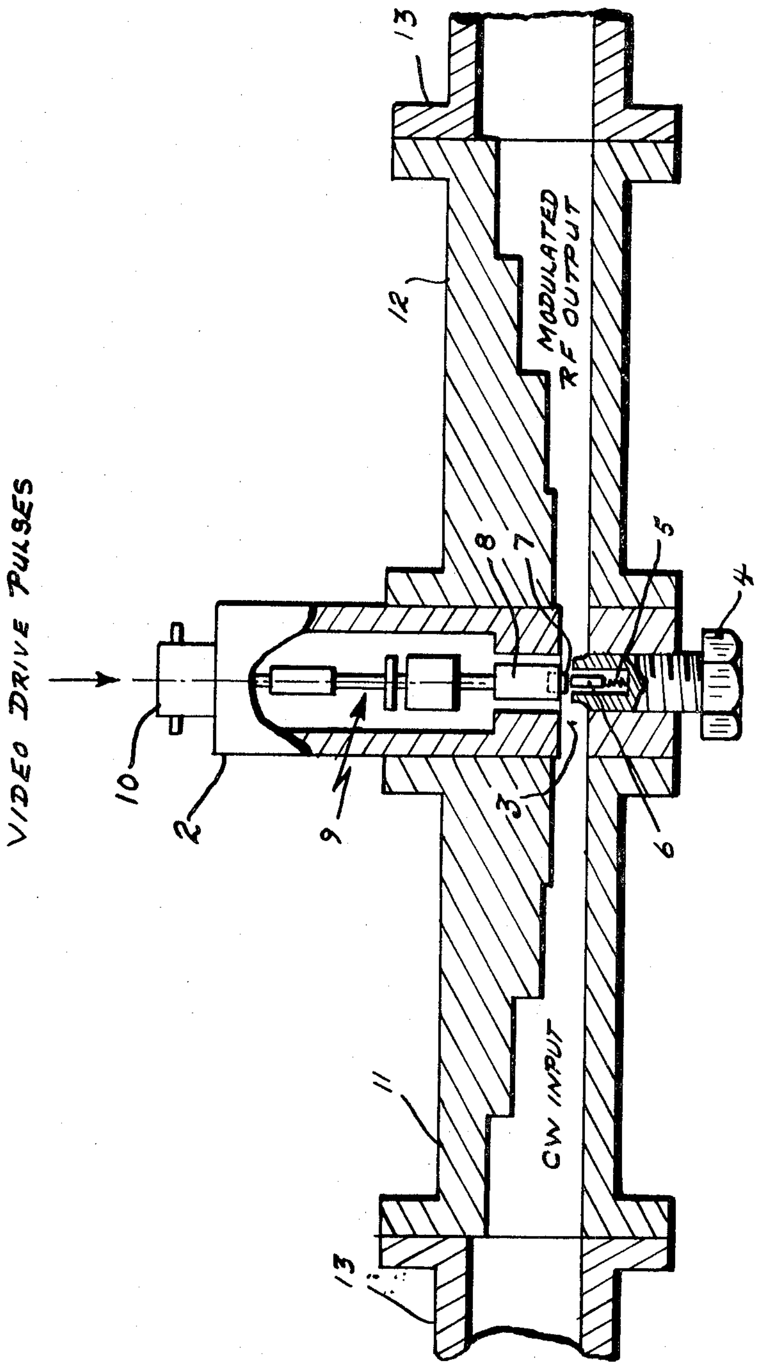

NANOSECOND PULSE MODULATOR

BACKGROUND OF THE INVENTION

This invention relates to microwave pulse modulators, and in particular to means for producing nanosecond and subnanosecond pulsing of CW carrier waves for use in short pulse radar systems and other applications. One particular application of such a pulse modulator is illustrated in our copending patent application entitled, *Pulsed Doppler Radar*, Ser. No. 266,815, filed on even date herewith. Radar systems of this type utilize extremely short pulses to achieve high range resolution and multiple receiver range gate capabilities. In order to realize these and other improved results, however, the radar system requires a modulator switch that will provide low insertion loss (1 db) with high isolation (20 db/diodes) and that will produce less than one nanosecond RF pulses with 5 volt video pulses in a 50 ohm system. Currently available devices are lacking in one or more of these characteristics. Accordingly there currently exists the need for nanosecond pulse modulators of the type described that are capable of subnanosecond pulsing CW microwave carrier waves. The present invention is directed toward accomplishing this and other ends.

SUMMARY OF THE INVENTION

The pulse modulator of the present invention comprises a housing member having a one-quarter height microwave waveguide slot transversing it and a varactor diode disposed across the slot. The one-quarter height waveguide slot is integrated into a waveguide system that supports transmission of the CW carrier wave to be modulated by means of one-quarter height to full height waveguide transformers. The varactor diode switches the CW carrier wave off and on by alternately presenting maximum and minimum insertion losses to the one-quarter height waveguide section. This is accomplished by forward and reverse bias control of the varactor diode with video drive pulses. A variable post member is disposed proximate to the varactor diode. Optimum performance is achieved appropriately tailoring varactor diode capacitance and package inductance and by control of the post capacitance.

It is a principal object of the invention to provide a new and improved microwave pulse modulator.

It is another object of the invention to provide a microwave pulse modulator capable of subnanosecond operation.

It is another object of the invention to provide a subnanosecond microwave pulse modulator having low insertion loss and high isolation capability.

These, together with other objects, features, and advantages of the invention will become more apparent from the following detailed description when taken in conjunction with the illustrative embodiment in the accompanying drawing.

DESCRIPTION OF THE DRAWING

The sole FIGURE of the drawing is a sectional view of one presently preferred embodiment of the pulse modulator comprehended by the invention.

DETAILED DESCRIPTION OF THE PREFERRED EMBODIMENT

Referring now to the sole FIGURE of the drawing, housing member 2 is integrated into microwave waveguide transmission line 13 by mean of full height to one-quarter height waveguide transformer 11 and one-quarter height to full height waveguide transformer 12. Housing member 2 is transversed by one-quarter height waveguide slot 3. A varactor diode 7 is disposed in slot 3 as shown. Video drive pulses are fed to varactor diode 7 through coaxial cable connector 10 and band stop filter 9. Video drive pulses can be supplied from a short pulse generator of the type illustrated in our copending patent application, *Stripline Video Pulse Generator*, Ser. No. 266,816, filed on even date herewith. Filter 9 is matched to the drive pulse line and can conveniently be a photo-etched stripline member, the last element of which is a section of coaxial line 8. The main purpose of the band stop filter is to block frequencies in the carrier pulse spectrum. The filter also provides a stable reference plane to the diode. Varactor diode 7 is mounted in the end of coaxial line section 8 across waveguide slot 3. Adjustable post 4 completes the diode mounting circuit. Slug 6 and spring 5 maintain constant restraining pressure on varactor diode 7 for all positions of post 5. Proper choice of varactor diode 7 parameter and post 4 conjunction is necessary so that varactor diode 7 can be switched from series to parallel resonance by the video drive pulses. Varactor diode 7 must be chosen to have a low capacitance and a low package inductance to make it resonant with the post capacitance at the operating frequency. Post capacitance is varied by changing post length, diameter and spacing. Means (not shown) are provided for reverse biasing varactor diode 7. When all parameters are properly chosen the reverse bias varactor diode with low capacitance is series resonant with the package inductance and maximum insertion loss results. When the varactor diode is forward biased by the video drive pulses it has a high capacity and is parallel resonant with the post capacitance, and a minimum insertion loss results.

Although the present invention has been described with reference to a specific embodiment, it is not intended that the same should be taken in a limited sense. Accordingly, it is understood that the scope of the invention in its broader aspects is to be defined by the appended claims only and no limitation is to be inferred from definite language used in describing the preferred embodiment.

What is claimed is:

1. A nanosecond pulse modulator for pulse modulating CW electromagnetic wave energy propagating in a microwave waveguide transmission line comprising a one-quarter height waveguide section, a full to one-quarter height waveguide transformer and a one-quarter to full height waveguide transformer connected therewith said transformer being adapted to integrate said one-quarter height waveguide section into the microwave waveguide transmission line, a varactor diode disposed across said one-quarter height waveguide section, a variable post member of conductive material disposed adjacent to said varactor diode, a drive pulse input line adapted to deliver video drive pulses to said varactor diode, and means for reverse biasing said varactor diode.

2. A nanosecond pulse modulator as defined in claim 1 including a bandstop filter matched to said drive pulse input line connecting said drive pulse input line and said varactor diode.

3. A nanosecond pulse modulator as defined in claim 2 wherein the capacitance and package inductance of the varactor diode is low and in resonance with the capacitance of said variable post member at the modulator operating frequency.

4. A nanosecond pulse modulator comprising
a housing member having
a one-quarter height waveguide slot transversion therethrough,
a coaxial cable input means, and
an adjustable post protruding into said waveguide slot,
a stripline low pass filter disposed within said housing member operably engaged to said coaxial cable input means, a coaxial filter element connected to said stripline low pass filter,
a varactor diode mounted on said coaxial filter element and protruding into said one-quarter height waveguide slot proximate to said adjustable post,
means for reverse biasing said varactor diode,
means for delivering video drive pulses to said coaxial input means, and
waveguide transformer means adapted to integrate said one-quarter height waveguide slot into a full height waveguide system.

5. A nanosecond pulse modulator as defined in claim 4 wherein the capacitance and package inductance of the varactor diode is low and in resonance with the capacitance of said variable post member at the modulator operating frequency.

* * * * *